United States Patent
Koskiniemi et al.

[11] Patent Number: 5,738,933
[45] Date of Patent: Apr. 14, 1998

[54] MUTLI-LAYER PRODUCT

[75] Inventors: Riitta Koskiniemi, Kyminlinna; Tapani Penttinen, Huutjärvi; Matti Salste, Imatra, all of Finland

[73] Assignee: Enso-Gutzeit Oy, Imatra, Finland

[21] Appl. No.: 621,765

[22] Filed: Mar. 22, 1996

Related U.S. Application Data

[63] Continuation of Ser. No. 415,923, Mar. 30, 1995, abandoned, which is a continuation of Ser. No. 154,823, Nov. 18, 1993, abandoned.

[30] Foreign Application Priority Data

Jun. 21, 1993 [FI] Finland .................. 932875

[51] Int. Cl.$^6$ .................. B32B 7/02; B32B 23/06; B32B 23/08; B32B 27/30
[52] U.S. Cl. .................. 428/214; 428/34.2; 428/34.3; 428/35.4; 428/36.6; 428/36.7; 428/215; 428/324; 428/341; 428/342; 428/479.3; 428/479.6; 428/483; 428/511; 428/512; 428/513; 428/514
[58] Field of Search .................. 428/34.2, 34.3, 428/35.4, 36.6, 36.7, 213, 214, 215, 324, 341, 342, 479.3, 479.6, 481, 483, 511, 512, 513, 514, 537.5

[56] References Cited

U.S. PATENT DOCUMENTS

| | | | |
|---|---|---|---|
| 4,647,509 | 3/1987 | Wallace et al. | 428/474.9 |
| 5,059,459 | 10/1991 | Huffman | 428/34.2 |
| 5,116,649 | 5/1992 | Massouda | 428/34.2 |
| 5,213,858 | 5/1993 | Tanner et al. | 428/34.2 |
| 5,225,256 | 7/1993 | Marano et al. | 428/34.2 |

FOREIGN PATENT DOCUMENTS

| | | |
|---|---|---|
| 0 293 098 A2 | 11/1988 | European Pat. Off. . |
| 0293098A2 | 11/1988 | European Pat. Off. . |
| 0 301 878 A1 | 2/1989 | European Pat. Off. . |
| 0 309 095 A1 | 3/1989 | European Pat. Off. . |
| 0 352 127 A2 | 1/1990 | European Pat. Off. . |
| 0 470 486 A1 | 2/1992 | European Pat. Off. . |
| 0 520 767 A1 | 12/1992 | European Pat. Off. . |
| WO 92/04187 | 3/1992 | WIPO . |

OTHER PUBLICATIONS

European Search Report on Appln. No. EP 94 30 2206.
Encyclopedia of Polymer Science and Engineeering vol. 7, pp. 79–80, 1987, John Wiley & Sons, Inc.

*Primary Examiner*—D. S. Nakarani
*Attorney, Agent, or Firm*—Townsend and Townsend and Crew LLP

[57] ABSTRACT

The invention relates to a multi-layer product, in particular for producing containers, comprising a layer formed of a fiber-based packing material on one surface of which a gas-tight multi-layer plastic coating is arranged. To prevent the formation of microholes, the gas-tight multi-layer plastic coating is formed of superposed 1–4 g/m$^2$ barrier plastic layer, 1–4 g/m$^2$ binder layer, and surface layer of a heat-sealable polyolefin material having sufficient thickness for liquid-tight heat sealing, so that the barrier plastic layer is the closest of said layers to the fiber-based packing material layer.

11 Claims, 1 Drawing Sheet

MUTLI-LAYER PRODUCT

This is a Continuation of application Ser. No. 08/415,923, filed Mar. 30, 1995, now abandoned, which is a Continuation of application Ser. No. 08/154,823 filed Nov. 18, 1993, now abandoned.

BACKGROUND OF THE INVENTION

The present invention relates to a multi-layer product, in particular for producing containers, comprising a layer formed of a fiber-based packing material on one surface of which a gas-tight multi-layer plastic coating is arranged.

Multi-layer products of the above type are today very well known for example in connection with containers for citrus fruit juices. Frequently, the fiber-based material is cardboard. The solution disclosed in European published application 0 293 098 is an example of the prior art solutions.

In connection with the prior art solutions, problems have been encountered in the manufacturing step of containers, particularly in heat sealing the plastic surfaces together, wherein pinholes may be induced in the multi-layer plastic coating. Pinholing presents a particular problem when the holes are produced on the inner surface of the container. The good gas-tightness characteristics of the plastic coating are in that case partly lost, since gas flow may even occur through microholes, even though despite the microholes the coating were liquid-tight.

Pinholing of the plastic coating is a result of, among other things, the fact that the high temperature applied to the coating in heat sealing softens and partly melts the plastic layers. A further reason for pinholing is that also the cardboard is heated in the sealing region, and on account of steam pressure the moisture in the cardboard tends to penetrate the softened and partly molten plastic layers, thus producing pinholes in the coating. The fact is that the higher the heat sealing temperature and the higher the moisture content in the cardboard, the more readily pinholes will be induced. The steam pressure in the cardboard tends to burst, spot-wise at small points, the plastic layer applied to the cardboard. The burst point serves as an initiator for pinholing.

SUMMARY OF THE INVENTION

It is an object of the present invention to provide a multi-layer product wherewith the drawbacks of the prior art can be eliminated. It has been found in connection with the invention that by selecting the type of the heat-sealable plastic for the multi-layer structure so that the heat sealing can be performed at a low temperature, pinholing can be diminished and even totally prevented. Selection of the plastic layer in accordance with the above results in that the plastic layers are not softened and do not lose their strength as readily as in the earlier solutions, thus hindering pinholing. On the other hand, the steam pressure generated by moisture in the cardboard is diminished. Pinholing can also be prevented by selecting as the plastic layer to be applied to the cardboard a plastic type that remains ductile and strong at heat sealing temperatures. Pinholing can further be influenced by selecting a plastic type that remains ductile in heat sealing for one of the layers. The multi-layer product of the invention is characterized in that the gas-tight multi-layer plastic coating is formed of superposed 1–4 g/m² barrier plastic layer, 1–4 g/m² binder layer, and surface layer of a heat-sealable polyolefin material having sufficient thickness for liquid-tight heat sealing, so that the barrier plastic layer is the closest of said layers to the fiber-based packing material layer.

The advantage of the invention over the prior art is first and foremost the fact that a higher strength and ductility than heretofore is achieved for the multi-layer product, and these properties are retained also at high temperatures, such as those employed in heat sealing. Consequently, the invention can employ even 15–30% lower coating thicknesses than heretofore. Furthermore, it is essential that the hot tack and strength of the seal in the heat sealing are improved, thus allowing the line speed in heat sealing to be increased by 10–20% with the same temperatures and quantities of heat. This factor again diminishes pinholing in the plastic coating. A further advantage of the multi-layer product of the invention is that the environmental stress crack resistance ESCR is much better than heretofore. This characteristic is significant in packaging of hard-to-hold products. For example in containers for liquid detergents, a high ESCR enables reduction of the total thickness of the plastic coating approximately by 30%, if one aims at a storage time of about one year. A further advantage of the invention is high abrasion resistance. As a result, no plastic dust is produced on high-speed container manufacturing lines, and the blanks run more smoothly on the lines than heretofore. In this connection it may be mentioned by way of example that when for instance a linear low-density polyethylene, i.e. a PE-LLD material, is used as the surface layer of the multi-layer plastic coating, the abrasion resistance is approximately twice the abrasion resistance of the prior art products. Also the other advantages set forth above have been explained mainly with PE-LLD material being the surface layer material in said multi-layer plastic coating.

BRIEF DESCRIPTION OF THE DRAWINGS

In the following the invention will be set forth in greater detail by means of the preferred embodiments presented in the accompanying drawing, in which.

DETAILED DESCRIPTION OF THE INVENTION

Figure 1:
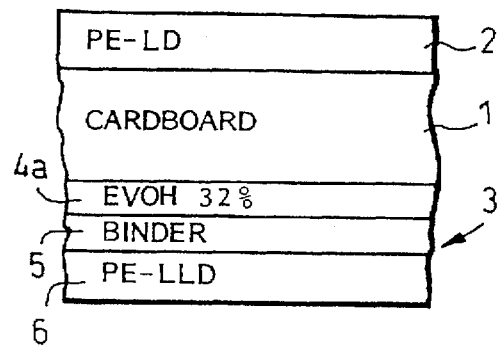
FIGS. 1–6 show preferred embodiments of the multi-layer product of the invention.

FIG. 1 shows a first preferred embodiment of the multi-layer product of the invention. Reference numeral 1 in FIG. 1 denotes a fiber-based packing material, which may be for example cardboard. In this embodiment, a layer 2 of a low-density polyethylene (referred to in this specification and in the drawings as PE-LD) is provided on one surface of the cardboard. The layer 2 is intended to provide the outer surface for the finished container. The PE-LD layer 2 is not indispensable, as the outer surface of the finished container can be realized in other ways as well. A lacquer surface or a surface otherwise treated to be water-repellent, or in some cases even an untreated cardboard surface, may be mentioned as examples.

In this embodiment, a gas-tight multi-layer plastic coating 3 is applied to the other surface of the cardboard 1, that is, to that surface which is intended to provide the inner surface of the finished container. The multi-layer plastic coating 3 is formed of superposed barrier plastic layer 4a, binder layer 5, and surface layer 6 of a heat-sealable polyolefin material.

In the embodiment of FIG. 1, the barrier plastic layer 4a is made of a ethylene vinyl alcohol copolymer containing 32 mole percent ethylene, and the surface layer 6 providing the inner surface of the container in turn is made of linear low-density polyethylene, (referred to in this specification and in the drawings as PE-LLD). The binder layer 5 can be for instance acid-modified PE-LLD. In the embodiment of FIG. 1, the layer thicknesses of the different layers in the multi-layer plastic coating are as follows: barrier plastic layer 4a 1-4 g/m², binder layer 5 1-4 g/m², and the thickness of the surface layer 6 is chosen to be sufficient for liquid-tight heat sealing. The thickness of layer 6 can vary depending on the product to be packed, for instance to be less than 20 g/m² with juices and to be in excess of 20 g/m² with aggressive substances, such as detergents. The thickness of the PE-LD layer 2 on the reverse side of the cardboard can be for example 20 g/m².

With the above solution, a thin, more advantageous coating and better barrier properties than heretofore are obtained. The further advantages of the solution according to FIG. 1 include good mechanical abrasion resistance, advantageous ESCR, good heat sealability, a lower sealing temperature, and good after-treatment characteristics. The embodiment according to FIG. 1 can also be used with advantage in connection with hard-to-hold liquids.

Figure 2:
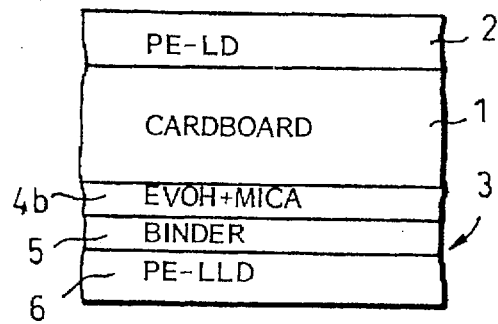

FIG. 2 shows another preferred embodiment of the invention. The embodiment of FIG. 2 essentially corresponds to the embodiment of FIG. 1, and therefore FIG. 2 employs the same reference numerals as FIG. 1 at corresponding points. The only difference to the example according to FIG. 1 is that the barrier plastic layer 4b of the gas-tight multi-layer plastic coating 3 is made of a blend of an ethylene vinyl alcohol copolymer (referred to in this specification and in the drawings as EVOH) and mica. This blend is a substance known per se, and is more closely described for instance in U.S. Pat. No. 4,818,782.

Mica gives EVOH good adhesion to cardboard in extrusion coating, and good adhesion in turn diminishes the tendency to blowing. Further, mica adds to the strength of EVOH, and this added strength is especially important in connection with heat sealing, thereby diminishing the tendency to blowing. Mica is also a material having a higher heat conductivity than EVOH, and thus the sealing heat is not as readily stored in the EVOH.

Mica imparts to EVOH good gas barrier properties and serves to reduce permeability to ultraviolet light. In view of recycling, the combination of ethylene vinyl alcohol copolymer and mica (referred to in this specification and in the drawings as EVOH+mica) is more practical than EVOH alone.

On account of the mica, the heat sealing temperature can be maintained at the same level in the blank production and on the filling machine as with the use of Al-foil cardboard. Likewise, the operating window for heat sealing is equally wide in the case of EVOH+mica as when Al-laminated cardboard is used. Without mica, the heat sealing temperature must be reduced by about 30° C. and the operating window diminished by about 20° C. When mica is added, however, the process can best be realized at the lower end of the operating window, and thus the steam pressure from the water contained in the cardboard is low and no microholes are induced. With no mica, the occurrence of microholes would be very likely.

Figure 3:
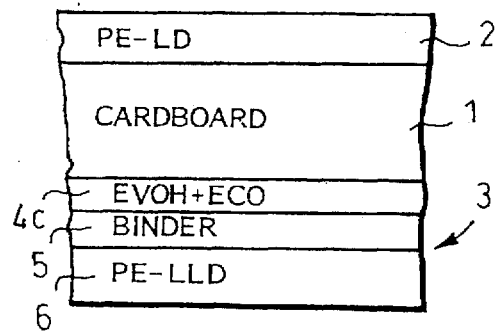

FIG. 3 shows a third preferred embodiment of the invention. The embodiment of FIG. 3 substantially corresponds to the embodiments of FIGS. 1 and 2. The only difference is that in the embodiment of FIG. 3, the barrier plastic layer 4c is made of a blend of ethylene vinyl alcohol copolymer and a copolymer of ethylene and carbon monoxide (ECO). FIG. 3 employs the same reference numerals as FIGS. 1 and 2 at corresponding points.

As stated previously, in the embodiment according to FIG. 3 the barrier plastic layer 4c is made of a blend of ethylene vinyl alcohol copolymer and an ethylene polymer having C=O groups, (referred to in the drawings as EVOH+ECO). Ethylene vinyl alcohol copolymer containing an ethylene polymer having C=O groups has higher melt strength than EVOH plastic alone. High melt strength is an important factor in view of extrusion coating. The inferior melt strength of neat EVOH causes pinholing in the EVOH layer in the extrusion coating alone. This is a result of the fact that the fibers of the cardboard to be coated tend to rupture a weak molten EVOH layer. Addition of for instance 30% by weight of ethylene polymer having C=O groups to the EVOH improves the melt strength so significantly that the fibers do not induce pinholes in the molten plastic film. This for its part enables direct application of EVOH+ECO to cardboard.

High melt strength prevents bursting of EVOH+ECO plastic in heat sealing and thereby precludes microhole formation. Generally speaking, an EVOH+ECO plastic layer remains very strong and ductile in heat sealing, and thereby the bursting tendency is substantially lower than with EVOH plastic alone.

Moreover, EVOH+ECO is less sensitive to variations in ambient humidity than EVOH alone. This is reflected on the heat sealing characteristics so that the steam pressure from the cardboard does not impair the strength of the blend to an equal extent as with neat EVOH. On the other hand, reduction in sensitivity to moisture is also reflected as a distinct decrease in the effect of ambient humidity on gas tightness.

Figure 4:
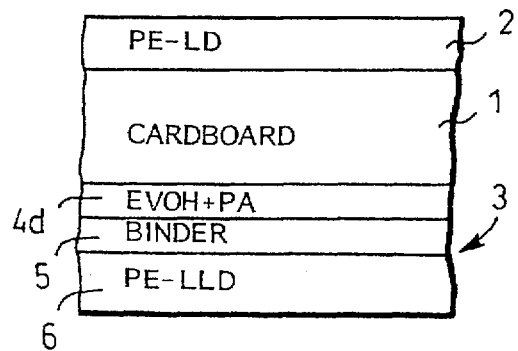

FIG. 4 shows a fourth preferred embodiment of the invention. The embodiment of FIG. 4 substantially corresponds to the embodiments of FIGS. 1–3. An essential difference to the previous embodiments is that the barrier plastic layer 4d is made of a blend of an ethylene vinyl alcohol copolymer and polyamide. FIG. 4 employs the same reference numerals as the embodiments of FIG. 1–3 at corresponding points.

In the embodiment of FIG. 4, the barrier layer is a blend of ethylene vinyl alcohol copolymer and polyamide (referred to in this specification and in the drawings as EVOH+PA). Various blends of EVOH and polyamide (PA) are known per se; examples of these are U.S. Pat. Nos. 4,952,628, 5,110,855 and 5,126,401. PA plastic is a very ductile and strong plastic. PA has a melting point between 230 and 240° C., while the melting point of EVOH is 168° C. The gas tightness characteristics of PA are not equal to those of EVOH. By blending EVOH with PA, the following advantages are achieved in multi-layer applications. Strength and ductility are improved in extrusion coating and heat sealing. For this reason, no pinholing occurs in extrusion coating, and, on the other hand, on account of the ductility the EVOH+PA layer will not rupture or let steam pressure through. In heat sealing, the operating window is 30° C. broader than with EVOH alone. In view of pulping, neat PA is a plastic that is too ductile. EVOH+PA in an appropriate ratio is a suitable solution in view of pulping.

Figure 5:
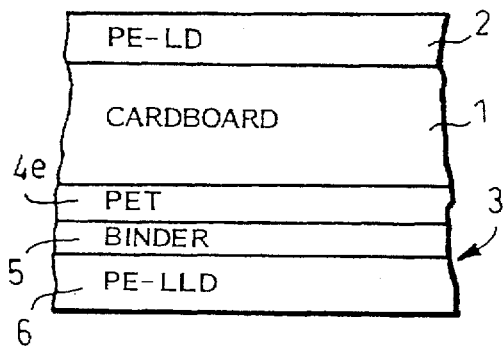

FIG. 5 discloses a fifth preferred embodiment of the invention. Also this embodiment substantially corresponds to the previous examples. The difference to the previous examples is that in this example the barrier plastic layer 4e is made of a thermoplastic polyester or thermoplastic copolyester. Examples of such materials are polyethylene terephthalate and polybutylene terephthalate. FIG. 5 employs the same reference numerals as the previous embodiments at corresponding points.

In the embodiment of FIG. 5, the barrier plastic is polyethylene terephthalate (referred to in this specification and in the drawings as PET). The gas tightness characteristics of PET are not equal to those of EVOH or PA, but it is significant that the barrier properties of PET do not vary depending on ambient humidity. The heat resistance characteristics of PET are good; the melting point is 255° C. PET also has good strength characteristics and remains ductile at temperatures exceeding 200° C. Thus microholes are not induced in PET in connection with heat sealing, and furthermore pinholing will not occur in connection with extrusion coating. PET plastics have sufficient adhesion to cardboard only when the amount of PET coating is about 40 g/m$^2$ or more. By using co-extrusion coating to produce for example a 3-layer coating, adhesion can however be accomplished even with small amounts of PET coating. All coating amounts mentioned in connection with FIG. 1 are also suitable for the embodiments of FIGS. 2 to 5.

A further property of PET plastics is that the variation of melt viscosity can even cause marked instability in extrusion coating. In three-layer extrusion coating, the instability of PET plastics is compensated for with the good stability of the other two layers. Good stability corrects grammage variations, edge waving in the plastic coating vanishes, and these factors together render the use of PET production-economical. Further, since PET plastic is stiff, it improves the rigidity of the container and enables long-term storage without bulging. This fact is essential particularly in connection with aseptic containers.

In all of the above embodiments, the barrier plastic layer is applied immediately to the fiber-based packing material layer 1. Such an arrangement is particularly advantageous when the surface of the fiber-based packing material layer is sufficiently smooth. An example of such a material is hot-calendered cardboard. If the surface of the cardboard is rough, it is preferred to apply a smoothing layer to the surface of the cardboard, smoothing the irregularities of the surface of the cardboard, in which situation the desired effect is achieved with a barrier plastic layer of a preferred thickness. The upright fibers in the rough surface may easily extend through the barrier plastic layer, thus impairing the efficiency of the finished product. The purpose of the smoothing layer is to provide the desired efficiency without any need for inordinately increasing the thickness of the barrier plastic layer.

Figure 6:
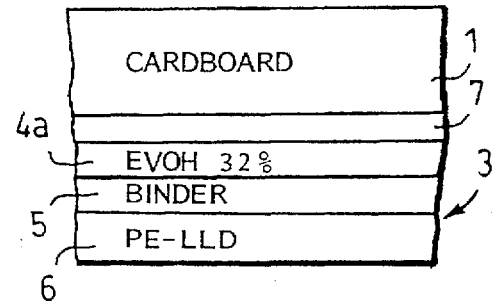

FIG. 6 shows an embodiment based on the embodiment of FIG. 1. The embodiment of FIG. 6 employs a smoothing layer 7 between the barrier plastic layer 4a and the fiber-based packing material layer 1. Further, the embodiment of FIG. 6 has no PE-LD layer on the other surface of layer 1, but for instance a lacquer layer is applied to said surface, as set forth above. The lacquer layer is however not shown in FIG. 6. It is obvious that the embodiment according to FIG. 6 can also be formed of the embodiments of FIGS. 2–5. It is also obvious that a PE-LD layer to be applied to the outer layer of the finished container can be used in connection with the embodiment employing a smoothing layer 7. The smoothing layer 7 can preferably be made of the same material as the binder layer 5. The thickness of the smoothing layer 7 can advantageously be of the same order as the thickness of the binder layer, for example less than 3 g/m$^2$.

The multi-layer structure of the invention can be manufactured for instance in the following manner. The manufacture will be explained below by means of the embodiment of FIG. 2, but it is obvious that all of the embodiments can be manufactured similarly. A web of cardboard 1 to be coated can, if necessary, be treated by the flame, corona, primer, or plasma method on both sides. The pretreated cardboard or paper is coated on both sides in a single run as follows: The PE-LD coating 2 of the surface providing the outer surface for the finished container is performed on flamed cardboard by the extrusion method. The plastic coating 3 of the inner surface of the finished container is performed in a single run by extruding all necessary layers at one time to provide the 3-layer coating shown in the figure. This enables low extrusion temperatures to be used, so that the heat-sensitive EVOH will not be thermally degraded. EVOH+mica is fed from an extruder of its own, the binder polymer from an extruder of its own, and PE-LLD from an extruder of its own. The outer surface of the cardboard laminate coated in the above manner is corona treated to enable printer's ink to strike in and to improve heat sealing. Also other treatments enhancing printing, such as Printable Glueable (PG) treatment, are possible. The cardboard-plastic laminate thus prepared can now be heat sealed by conventional methods.

The invention set out above is particularly advantageous as a packing material for citrus juices, water, and other fluid foodstuffs, for example materials that are folded into square, rectangular or cylindrical containers.

The invention disclosed above has in no way been limited to the embodiments presented, but the invention may be modified fully freely within the scope of the claims. Thus it is obvious that the multi-layer product of the invention or its details need not necessarily be exactly as shown in the figures, but other solutions are possible as well. For example, layer 6 is not limited to PE-LLD material, but the polyolefin of said layer may be for example low-density polyethylene, high-density polyethylene, polypropylene, polybutylene, etc. The polyolefin material of layer 6 may also be a blend, for example a blend of a linear low-density polyethylene and a low-density polyethylene. The fiber-based packing material need not necessarily be cardboard, but other materials are possible as well, such as paper, plastic-coated cardboard, etc.

We claim:

1. A multi-layer product, in particular for producing containers, comprising a layer formed of a fiber-based packing material on one surface of which a gas-tight multi-layer plastic coating is arranged, said gas-tight multi-layer plastic coating being formed of superposed
   (a) 1–4 g/m$^2$ barrier plastic layer comprised of an ethylene vinyl alcohol copolymer,
   (b) 1–4 g/m$^2$ binder layer comprised of low density polyethylene, and
   (c) surface layer of a heat-sealable polyolefin material having sufficient thickness for liquid-tight heat sealing, so that the barrier plastic layer is the closest of said layers to the fiber-based packing material layer.

2. A multi-layer product as claimed in claim 1, wherein the barrier plastic layer is applied directly to the fiber-based packing material layer.

3. A multi-layer product as claimed in claim 1, wherein a smoothing layer is disposed between the barrier plastic layer and the fiber-based packing material layer.

4. A multi-layer product as claimed in claim 3, wherein the smoothing layer is made of the same material as the binder layer.

5. A multi-layer product as claimed in claim 1, wherein the barrier plastic layer is made of an ethylene vinyl alcohol copolymer material containing 32 mole percent ethylene.

6. A multi-layer product as claimed in claim 1, wherein the barrier plastic layer is made of a blend of an ethylene vinyl alcohol copolymer and mica.

7. A multi-layer product as claimed in claim 1, wherein the barrier plastic layer is made of a blend of an ethylene vinyl alcohol copolymer and a copolymer of ethylene and carbon monoxide (ECO).

8. A multi-layer product as claimed in claim 1, wherein the barrier plastic layer is made of a blend of an ethylene vinyl alcohol copolymer and polyamide.

9. A multi-layer product as claimed in claim 1, wherein the binder layer is made of an acid-modified low-density polyethylene.

10. A multi-layer product as claimed in claim 1, wherein the polyolefin material of the surface layer is a linear low-density polyethylene.

11. A multi-layer product as claimed in claim 1, wherein the polyolefin material of the surface layer is a low-density polyethylene.

* * * * *